Feb. 16, 1971 J. A. HIBNER 3,564,513

ADDRESS TRANSLATOR

Filed Jan. 31, 1969 3 Sheets-Sheet 1

Feb. 16, 1971 J. A. HIBNER 3,564,513

ADDRESS TRANSLATOR

Filed Jan. 31, 1969 3 Sheets-Sheet 3

3,564,513
Patented Feb. 16, 1971

3,564,513

ADDRESS TRANSLATOR

John A. Hibner, Sierra Madre, Calif., assignor to Burroughs Corporation, Detroit, Mich., a corporation of Michigan Filed Jan. 31, 1969, Ser. No. 795,590
Int. Cl. G06f *7/28*
U.S. Cl. 340—172.5 16 Claims

ABSTRACT OF THE DISCLOSURE

A rotating recording surface having a predetermined information format. A plurality of transducers read and write on the surface. A controllable transducer selection circuit and an angular position selection circuit selects a transducer and an angular position of a recording surface for reading and writing. An arithmetic unit receives a coded address designating a location to be accessed and converts the address to separate transducer selection and angular position selection signals for controlling the respective selection circuits.

BACKGROUND OF THE INVENTION

Field of the invention

This invention relates to cyclical storage devices and, more particularly, to an address translator for conversion of signals in one code to signals in another code for control of reading and writing in cyclical storage devices.

Description of the prior art

Cyclical storage apparatus using such devices as rotating disks or drums are commonly used for storing information. These devices have magnetic recording surfaces and transducers for reading and writing on the recording surfaces. In a system having a transducer per track of information on the recording surface, a selection circuit is used to select the proper transducer, and angular position circuitry is provided for selecting the proper position of the recording surface for reading or writin. Separate signals are required to control the two selection circuits. For example, a transducer selection signal is required for controlling the transducer selection circuit and an angular position signal is required for controlling the angular positon selection circuitry.

Heretofore, it has been required to provide separate transducer and angular position selection signals for addressing such storage devices. This arrangement has certain disadvantages. For example, if the device is used in a data processing system it is necessary for the programmer to provide a program to cause the address, with these required separate signals, to be sent to the storage device. If the separate signals are not provided then a costly decoding matrix is required to convert the address to these separate signals.

In such prior art systems, the programmer for the overall data processing system by and large dictated the number of addressable angular positions on a recording surface. This then required the designer of the storage device to provide the programmer dictated number of addressable angular positons. As a result, inefficiency in the recording of information resulted.

SUMMARY OF THE INVENTION

In order to make the most efficient use of a cyclical storage device using a rotating surface for recording, it is desired to use the most efficient number of angular positions on a recording surface. For example, it may be desired to have more addressable angular positions near the outside of a recording disk than it is towards the center of the recording disk. Accordingly, it is desired to have a system wherein the programmer for the system can provide an address signal whose signal is independent of the number of addressable angular positions.

To this end, an address translator is provided having an arithmetic device which receives a composite signal consisting of a coded address and utilizing repetitive subtraction operations translates this address into separate transducer selection and angular position selection signals for the storage device. The thus translated signals may then be applied to transducer selection circuitry and angular position circuitry without intermediate translations.

DESCRIPTION OF THE PREFERRED EMBODIMENT

Figure 1:
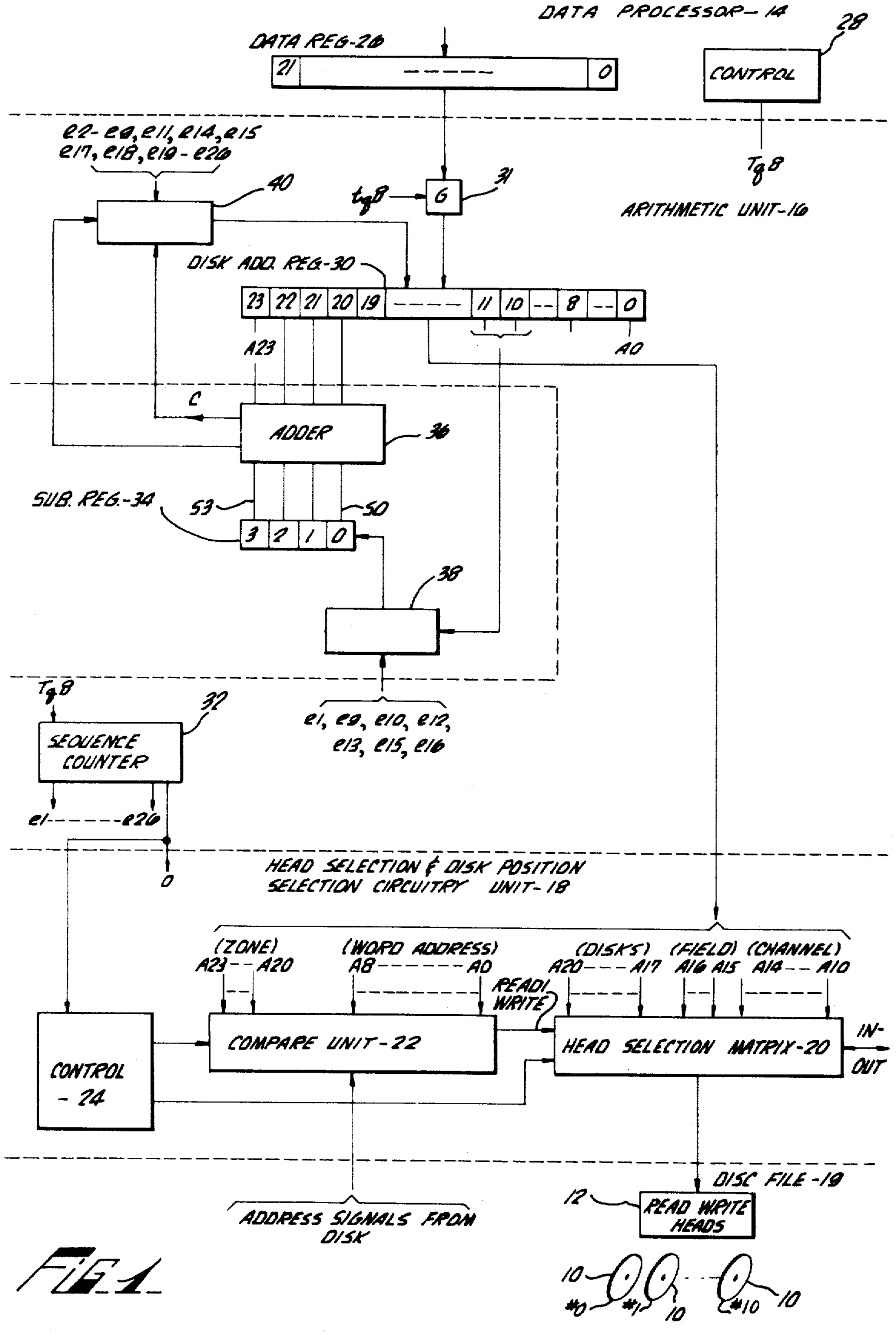
FIG. 1 is a block diagram of a data processing system and embodies the present invention.

Before considering the block diagram of FIG. 1 in detail, consider the information format of the disks employed in the disk file of FIG. 1. For purposes of illustration, eleven disks 10 numbered #0–#10 are included in the system. Each disk 10 has two surfaces with magnetic recording films thereon as commonly used in the computer art. On each disk surface there are three annular fields identified as Field #1, Field #2, and Field #3. Each field contains 32 channels of information. The channels are identified by the symbols CH0 through CH31. A channel has three different readable tracks. The three readable tracks in each channel are split up on two disk surfaces. The disk surfaces are associated in pairs and each associated pair of disk surfaces carry the three tracks making up a particular channel. For example, each channel CH0 has two tracks on the disk surface of FIG. 2 and one track on the disk surface of FIG. 3. Channel CH1 on the other hand has one track on the disk surface of FIG. 2 and two tracks on the disk surface of FIG. 3. The number of tracks per channel alternates between two and one across each of the fields of the disks. It can be seen that the even numbered channels contain two tracks on the disk surface of FIG. 2 and one channel on the disk surface of FIG. 3, whereas the odd numbered channels have one track on the disk surface of FIG. 2 and two tracks on the disk surface of FIG. 3.

Transducers or read/write heads 12 are provided for reading and writing in the tracks of information. One individual read/write head is provided in 12 for each track on each of the disk surfaces. In this manner, it is only necessary to select the head corresponding to a particular track on which it is desired to read or write.

Each of the annular fields are divided up into different numbers of radial zones. Field #1 has three zones identified as Zones 0 through 2; Field #2 has four zones identified as Zones 0 through 3; and Field #3 has five zones identified as Zones 0 through 4. Each of the zones have 512 radial word addresses. The 512 radial word addresses are identified by the numerals 0 through 511. Each of the word addresses for all zones are grouped together. For example, in Field #1 word addresses 0 for Zones 0 through 2 are grouped together. Similarly, in Field #2 the word addresses 0 for Zones 0 through 3 are grouped together, and in Field #3 the word addresses 0 for Zones 0 through 4 are grouped together. Similarly, the word addresses 0 through 511 are each grouped together in the same manner.

Thus, it may be seen that there is a different interlace ratio for each of the fields. For example, Field #1 has an interlace ratio of 3; Field #2 has an interlace ratio of 4; and Field #3 has an interlace ratio of 5. It should also be noted that in Field #1 there is a total of 96 channels in all three zones. 96 channels is determined by multiplying the number of channels (i.e. 32) times the total number of zones, (i.e. 3). Similarly, in Field #2 there is a total of 128 channels in all zones, (i.e. 32×4). Similarly, in Field #3 there is a total of 160 channels in all zones (i.e. 32×5).

Figure 2:
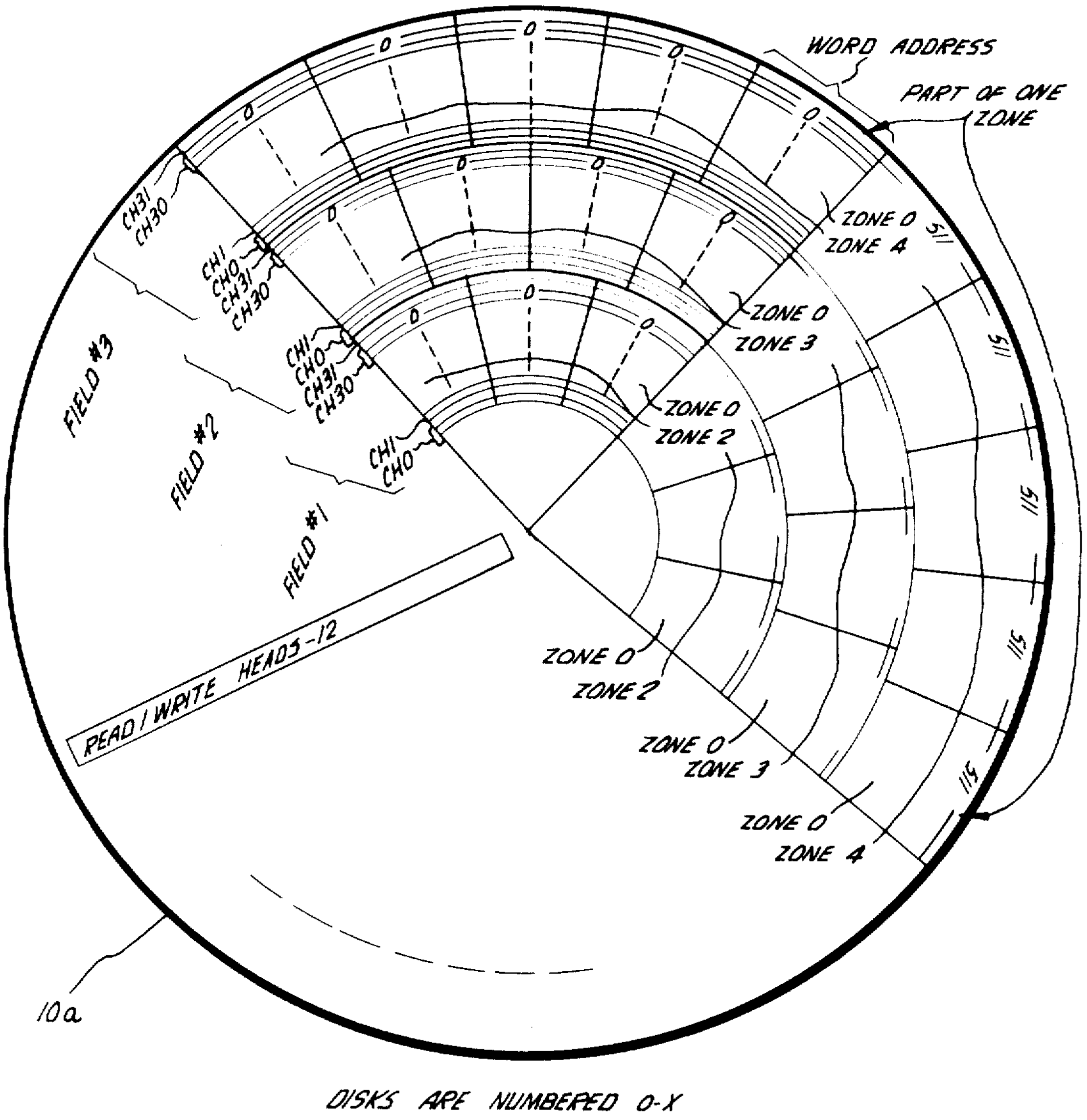
FIGS. 2 and 3 are sketches illustrating the format of the information on the disks employed in the disk file for the data processing system of FIG. 1.
Figure 3:
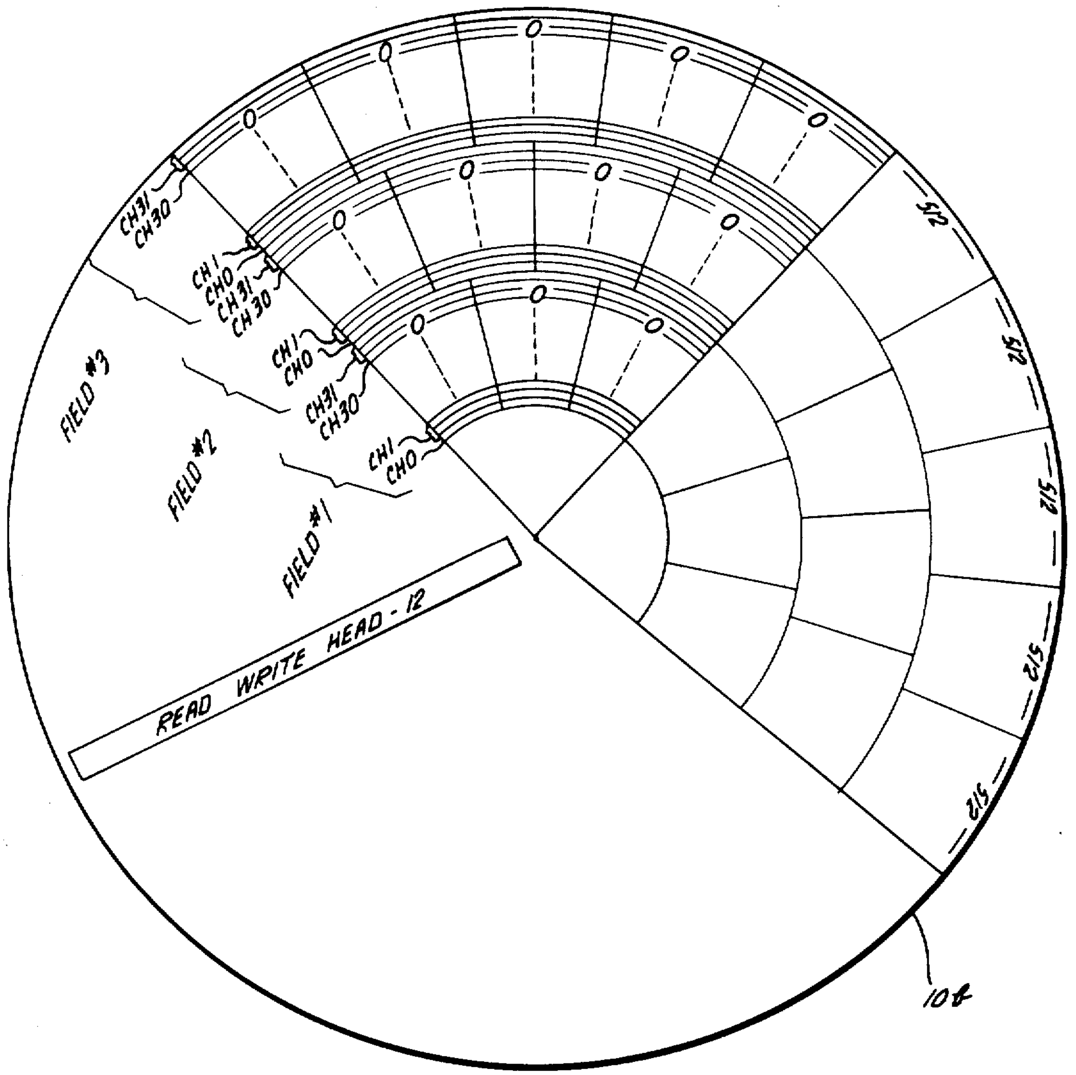

Table I illustrates the information format of the disk surfaces shown in FIGS. 2 and 3.

In the embodiment of the invention shown in FIG. 1, it is assumed that it is desired to translate a pure binary address into the following individual signals:

a zone signal;
a word address signal;
a disk signal;
a field signal; and
a channel signal.

It will be evident to those skilled in the art that the disk, field and channel signals may be used to control a head selection matrix to select three read/write heads in 12 for simultaneously reading or writing in three tracks or one channel of information. It will also be evident that the zone and word address signals may be used to select the proper angular position of the disk for reading or writing.

In accordance with one aspect of the present invention, the following sequence of five steps are performed to translate the pure binary address to the individual signals listed above. For purposes of illustration a pure binary address having twenty-two binary bits is used.

*First,* there are 512 word addresses per zone. The 512 word addresses are the smallest group of sequential addresses. Therefore, the received binary address is divided by 512. Since 512 is an exact binary number, it is only necessary to move the binary point nine places to the left to perform this division. This feature is taken advantage of in the embodiment of the invention shown in FIG. 1. The quotient (Q1) from the division is now contained in the 13 bits to the left of the binary point and the remainder (R1) is contained in the 9 binary bits to the right of the binary point. The remainder (R1) of this division is the desired word address. The quotient (Q1) describes the balance of the starting address (including zone number, channel number, field number, and disk number).

*Second,* there are 384 addressable zones on one disk. The number 384 is derived by adding the total number of channels in all fields per zone (i.e. 96+128+160=384). The quotient (Q1) from the first step is now divided by 384. The quotient (Q2) of this division is the disk number and the remainder (R2) of this division includes the zone number, channel number, and field number.

*Third,* there are 96 channels in Field #1 (see Table I). Therefore an attempt is made to subtract 96 from the remainder (R2) obtained in the second step. If the remainder (R2) in the second step is equal to, or less than, 96, the subtraction would be invalid and, therefore, does not take place. The zone address is then in Field #1 and the remainder (R2) contains the channel and zone numbers. If, however, the remainder (R2) is greater than 96, then the subtraction is valid and takes place. The difference (D1) from this subtraction describes the channel and zone numbers in either Field #2 or Field #3.

*Fourth,* there is a total of 128 channels in all zones of Field #2. If the difference (D1) in the third step is equal to, or less than, 128, this later subtraction would be invalid and, therefore, does not take place. The zone address is then in Field #2 and the difference (D1) contains the channel and zone numbers. If, however, the difference (D1) is greater than 128, the subtraction is valid and takes place. The difference from this second subtraction (D2) is the channel and zone numbers in Field #3

The accepted value (R2, D1 or D2) resulting from steps 3 and 4 includes the channel number and the zone number.

*Fifth,* the accepted value from steps 3 and 4 (R2 or D1 or D2) is divided by the zone interlace ratio. The particular zone interlace ratio used is determined from the field in which the accepted value lies as determined in steps 3 and 4. In other words, if the remainder (R2) is equal to, or less than, 96, it is Field #1. If the difference (D1) is less than 128, then it is Field #2. If the difference (D1) is greater than 128, it is Field #3. The quotient (Q3) obtained in this step is the channel number and the remainder (R3) is the zone number.

To be explained in greater detail, the zone, word address, disk, field and channel numbers are stored in the form of digital signals in a disk address register and standard addressing techniques are used to address the corresponding locations in the disk file.

Table II sets forth pertinent values used in the conversion process. Values are shown both in the decimal number system (on the left) and in the binary system (on the right). Referring to Table II, it will be noted that there are a maximum of 2,162,688 addressable words in the disk file.

The arithmetic operations are actually performed using a series of subtractions. The arithmetic manipulations are done by taking the 1's complement of the subtrahend and adding 1 to the 1's complement. It will be evident to those skilled in the art that the difference between two numbers can be obtained by taking the 1's complement of the subtrahend, adding 1 to the 1's complement, and then adding the two numbers together, provided that the difference is always a positive number. The translator in FIG. 1 only permits a subtraction (or addition using the 1's complement of the subtrahend +1) to be completed when the difference is a positive value. The difference will be a positive value whenever the sum of the 1's complement of the subtrahend +1 and the minuend produces a carryout at the most significant end. This mathematical principle is used extensively in the translator as will be described in more detail hereinafter. Table II also shows the 1's complement +1 of the various subtrahends required in the translation.

Consider now the data processing system of FIG. 1. The data processing system includes a data processor 14 which is coupled to head selection and disk position selection circuitry unit 18 through an arithmetic unit 16. The head selection and disk position selection circuit unit 18 is connected to a storage means or disk file 19. The disk file 19 contains the eleven disks #0 through #10 indicated at 10. A plurality of read/write heads 12 are associated with the disks in the manner described with reference to FIGS. 2 and 3.

The head selection and disk position selection circuitry unit 18 contains a conventional head selection matrix 20. The individual signals designating a disk, a field and a channel are applied to the head selection matrix 20 which, in turn, selects the corresponding read/write heads 12. It will be evident to those skilled in the art that the head selection matrix 20 comprises a transducer selection circuit and may be one of any number of those well known in the computer art. A compare unit 22 compares the individual signals designating a zone and a word address with address signals coming from the disk. The address signals from the disk correspond to the angular position of the disk. When a predetermined correspondence is detected by the compare unit, a control signal is applied to the head selection matrix 20 causing the desired reading or writing operation to take place. A control unit 24 controls the operation of the compare unit 22 and the head selection matrix 20. It will be evident to those skilled in the art that the compare unit 22 forms an angular position selection circuit for causing reading or writing at the appropriate angular position of a disk and may be composed of any one of a number of circuits well known in the computer art. To be explained in more detail, the individual zone, word address, disk, field and channel signals are stored in an address register 30 and are applied to the head selection and disk position selection circuitry unit 18 following a translation operation.

The data processor 14 has a data register 26 and a control unit 28. The data register 26 has 22 storage cells identified by the symbols 0 through 21 in which the 22 bits of the binary address are stored. The control unit 28 applies a control signal at the Tg8 output whenever a binary address is contained in the data register 26 and which is to be translated by the arithmetic unit 16.

The arithmetic unit 16 contains the disk address register 30. A gate 31 transfers binary addresses which are to be converted from the data register 26 into the disk address register 30. The disk address register 30 is the register in which the binary number is stored, converted, and finally the resulting separate signals are applied to the head selection and disk position circuitry. In this particular embodiment of the invention all intermediate quotients, results, and differences are stored into the disk address register 30 as will be explained in more detail hereinafter.

A subtractor register 34 is provided to store the subtrahends used during the five translation steps. An adder 36 is connected between the subtractor register 34 and the disk address register 30 for performing the actual commutations. The disk address register 30 has 23 storage cells referenced by the numerals 0 through 22. The subtractor register 34 only has four storage cells referenced by the numbers 0 through 3. It is only necessary to consider a maximum of four bits in the subtrahend at any one time. Accordingly, the subtrahend register 34 only contains four storage cells and the adder 36 is arranged to add a total of only 4 bits at any one time. This is one feature of importance but one which is not essential to the broader concepts of this invention.

The adder 36 is a full binary adder which produces an output corresponding to the sum and a carry signal. A carry signal is produced only if there is a carryout from the most significant position (or leftmost position) of the adder 36.

A sequence counter 32 is provided for sequencing the operation of the arithmetic unit 16. A gating matrix 38 is provided for storing subtrahends into the subtractor register 34. A gating matrix 40 is provided for storing information into the disk address register 30 during the translation steps. The operations of the circuits 38 and 40 are described in more detail hereinafter.

It will become evident that the sequence counter 32 forms a control means which provides an output signal corresponding to each parameter in the information format of the disk which is to be determined. Also, the gating matrix 38 and the subtract register 34 form a parameter generator which is responsive to each control signal from the control means (32) for forming at least one parameter signal to be used for modifying the coded addresses from the data processor 14. The adder 36 and gating matrix 40 form a combining means utilizing the parameter signals for performing a series of repetitive subtractions on the coded address for converting such coded address to individual transducer selection and angular position selection signals.

With the general arrangement of the circuits of FIG. 1 in mind, consider an actual example of the operation thereof. Table III shows a step by step example of the operation for the converting of the decimal number 1,077,560 which expressed in the binary number system is as follows:

0100000111000100111000

Only the content of cells 9 through 23 of the disk address register 30 are shown in Table III because the cells 0 through 8 do not change after the first step of the conversion operation as more fully explained hereinafter.

Initially the above binary number is stored into the data register 26 in the data processor 14. Subsequently, a control signal is formed at the Tg8 output by the control unit 28, causing the gate 31 to store the binary number into the disk address register 30. The control signal at Tg8 is also applied to the sequence counter 32 causing it to commence generating a sequence of signals at output circuits *e*1 through *e*26. The sequence counter may be composed of any one of a number of circuits well known in the computer art for forming control signals at the output circuits *e*1 through *e*26, one at a time, after being initiated by the control signal at Tg8.

Referring back to the sequences of five steps for the conversion operation, the *first* step is to divide the binary address by the binary equivalent of the decimal number 512. Since the binary equivalent of the decimal number 512 is an exact binary number, the effect of this division is to move the binary point nine binary bits to the left. The remainder (R1) becomes the nine least significant binary bits and the rest of the word (thirteen bits) becomes the quotient (Q1). To this end, the signal at Tg8 causes the gate 31 to store the least significant nine bits of the binary address into storage cells 0 through 8 of the disk register 30. Thus, cells 8 through 0 of the disk address register now contain the bits 100111000 (not shown in Table III). Also, the signal at T*g*8 causes the gate 31 to store the most significant thirteen bits of the binary address into storage cells 11 through 23 of the disk address register 30 as shown opposite T*g*8 in Table III. It should now be evident that the first division has been completed wherein the binary address is divided by the binary equivalent of the decimal number 512. The quotient (Q1) is now contained in storage cells 11 through 23, whereas the remainder (R1) is contained in storage cells 0 through 8 of the disk address register 30. The remainder signal (R1) is the desired "word address." Thus, the first translation step is now complete and the desired word address is 100111000.

The *second* step in the translation operation is to divide the quotient (Q1) now contained in storage cells 11 through 23 of the disk address register 30 by the binary equivalent of the decimal number 384. This division is accomplished by a series of subtractions using the 1's complement +1 of the binary equivalent of 384. The 1's complement +1 of the binary equivalent of 384 contains all zeros except for the most significant three bits (see Table II). Accordingly, only the most significant three bits of the 1's complement +1 are stored into cells 3 through 1 of the subtractor register 34 and cell 0 is set to 0. To this end, the sequence counter 32 forms a control signal at the *e*1 output causing the gating matrix 38 to store the three binary bits into the subtractor register 34 and causing it to store a 0 bit into cell 0. This condition is indicated in Table III opposite *e*1.

The arithmetic unit 16 then proceeds with the steps required to carry out the division. To be explained in detail, the binary bits of the quotient (Q2) obtained during the division are stored bit by bit into cell 10 of the disk address register 30. Each bit stored in the register 30 is then shifted to the left one bit as each subsequent bit of the quotient is stored. The intermediate and final remainder (R2) of the division are stored to the left of the bits of the quotient (Q2). With reference to Table II it will be seen that the maximum number of bits in the quotient (Q2) (or disk number) is four. Accordingly, a maximum of only four subtractions is required. To this end, control signals at *e*2 through *e*9 are generated.

Continuing with the *second* translation step, the adder 36 adds the bits stored in the subtractor register 34 to the corresponding bits of the disk address register 30 and immediately forms an output corresponding to the sum and an output indicative of whether there is a carry. With reference to *e*2 in Table III, the sum can be seen and it will be seen that the sum does not produce a carry and the adder does not form a carry signal ($C=0$).

The gating circuit 40 is arranged so that it will store the sum produced out of the adder 36 back into the three most significant storage positions of the register 30 and a 1 bit into the cell 10 (of register 30) whenever the adder 36 produces a carry signal at the output C and a control signal is simultaneously formed at any one of the outputs, *e*2, *e*4, *e*6 and *e*8. If no carry signal is produced by the adder then the timing signals do not cause any change in the register 30.

Since the adder circuit 36 is not producing a carry ($C=0$ at *e*2, the gating matrix 40 does not alter the content of the disk address register 30.

The control signals at *e*3, *e*5, *e*7 and *e*9 cause the gating matrix 40 to shift the content of cells 10 through 22 one cell to the left and set cell 10 to 0. It should also be noted that cell 10 initially contains a 0 bit.

Accordingly, the control signal at *e*3 causes the disk address register 30 to unconditionally shift cells 10 through 22 one bit position in the left in the disk address register 30.

The first bit, a 0 bit, of the quotient (Q2) is now stored in the register 30 in cell 11. To separate the quotient (Q2) from the partial remainder a "." is shown in Table III. Thus, the 0 bit of the quotient (Q2) is indicated just to the right of the decimal point at *e*3 in Table III and is the most significant bit of the quotient (Q2).

With the information shifted in the disk address register 30 to the position shown at *e*3 in Table III and with the most significant bit of the quotient (Q2) in bit position 11, the address adder 36 again adds the content of the most significant three bits of the subtractor register 34 and the disk address register 30 and produces an output corresponding to the sum. With reference to Table III it will be seen that the sum causes the adder to form a carry signal ($C=1$).

To control signal at *e*4 in coincidence with the carry signal from the adder 36, causes the gating matrix 40 to store the sum produced at the output of the adder 36 into the most significant three bit positions of the disk address register 30, leaving the remainder of the bit positions 12 through 23 unaltered. Additionally, since a carry signal ($C=1$) is formed by the adder 36 the gating matrix 40 stores a 1 bit into bit position 10 of the disk address register 30 following the first bit of the quotient (Q2). The two bits of the quotient are shown in Table III at *e*4 to the right of the decimal point and are 01.

The control signal at *e*5 causes the gating matrix 40 to shift the content of the bit positions 10 through 22 of the disk address register 30 one bit position to the left resulting in the intermediate remainder and quotient shown at *e*5 in Table III.

The action of the gating matrix 40 is repeated during the control signals at *e*6 through *e*9 similar to that described hereinabove for control signals at *e*2 through *e*5. The operation can be followed with reference to the foregoing description and the example shown in Table III. Finally, the control signal at *e*9 causes the gating matrix 40 to shift the content of bit positions 10 through 22 one bit position to the left to the position shown at *e*9 in Table III.

At this point the bit positions 15 through 23 contain the remainder (R2), and bit positions 11 through 14 contain the quotient (Q2).

The quotient (Q2) is the disk number. The remainder (R2) contains the zone number, the channel number, and the field number.

The *third* step in the translation is now entered. In the third step of the translation the binary equivalent of the decimal number 96 is subtracted from the remainder (R2) to determine the field, the channel, and zone numbers. Table II shows the 1's complement +1 of the binary equivalent of the decimal number 96. All bits to the right of the most significant four bits are 0. Therefore, only the most significant four bits need be considered in the subtraction.

Accordingly, the control signal at *e*10 causes the gating matrix 38 to store the most significant four bits of the 1's complement +1 of the binary equivalent of the decimal number 96 into the four cells of the subtractor register 34. This condition is indicated at *e*10 in Table III. The adder 36 combines the most significant four bits contained in the address register 30 and the content of the subtractor register 34 and produces a sum and a carry signal ($C=1$). The carry signal indicates that the subtraction is valid and can take place.

The control signal at *e*11 in combination with the carry signal ($C=1$) causes the gating matrix 40 to store the sum formed by the adder circuit 36 back into the four bit positions 20 through 23 of the disk address register 30 and store a one bit into bit position 9 of the disk address register 30. The one bit stored at bit position 9 indicates that the desired field is 2 or 3, since the remainder (R2) has been found to be greater than 96. The difference of the subtraction is D1 which is now stored in bit positions 15 through 23 of the register 30. Note, that if a carry signal is not produced ($C=0$) at *e*11, the subtraction is not valid and the remainder (R2) would be smaller than 96. Under these conditions the signal at *e*11 would not cause the gating matrix 40 to store the output of the adder 36 into the register 30. However, the gating matrix 40 would store a 0 bit into the cell 9 of the register 30.

The *fourth* step is now entered wherein the binary equivalent of the decimal number 128 is subtracted from the difference D1. Referring to Table II it will be seen that the 1's complement +1 of the binary equivalent of the decimal number 128 contains all zeros to the right of the most significant two bits and can be disregarded in the subtraction operation. However, the adder 36 can accommodate four bit positions. Accordingly, the most significant four bit positions are used in the fourth step of the translation operation.

To this end, the sequence counter 32 forms a control signal at *e*13 causing the gating matrix 38 to store the four most significant bits of the 1's complement +1 of the binary equivalent of the decimal number 128 into the subtractor register 34. The adder 36 combines the four bits contained in the subtractor register 34 with the four most significant bits of the difference D1 and forms an output corresponding to the sum. With reference to Table III it will be seen that there is no carry signal ($C=0$) from this subtraction and, accordingly, the subtraction is invalid and does not take place. Because of the lack of a carry signal, the control signal at *e*14 does not cause the gating matrix 40 to alter bit positions 15 through 23 of the disk address register 30 but does cause the gating matrix 40 to store a zero bit into bit position 10. The control signal at *e*15 causes the content of bit positions 9 through 22 to be unconditionally shifted one bit position to the left. Thus, bit positions 16 through 23 now contain the difference (D1) and the Field No. is stored in bit positions 10 and 11. The bits of the Field No. are 01 representing Field #2.

It should be noted that, should the subtraction at *e*14 be valid and the adder 36 produce a carry signal ($C=1$), then the control signal at *e*14 would cause the gating matrix 40 to store the sum produced by the adder 36 into the four most significant bit positions of the disk address register 30. Further, the control signal at *e*14 would cause bit positions 10 and 9 to be changed to 10, respectively, representing Field # so that bit positions 10 and 9 represent Field 3. Under these conditions the value in the bit positions 16 through 23 at *e*15 would be the difference (D2).

It should be noted that following the signal at *e*15 only one of the values R2, D1 and D2 will always be stored in bit positions 16 through 23. In other words, if R2 is less than 96, then R2 will end up in bit positions 16 through 23. If D1 (which is R2 minus 96) is less than 128, then the D1 will end up in bit positions 16 through 23. If D1 is greater than 128, then D2 (which is D1 minus 128) will end up in bit positions 16 through 23.

The *fifth* step of the translation operation is now entered. During the fifth translation step the value obtained in the second, third and fourth step is divided by the proper zone interlace ratio and the intermediate remainder and final remainder, (R3), are formed and stored in the left-hand end of register 30, just to the left of the quotient Q2. The bits of the quotient Q3 from the division are stored a bit at a time into bit position 9 of the disk address register 30. As each bit of the quotient (Q3) is stored the previously formed bits of the quotient (Q3), as well as the bits of the remainder (R3), Q2 and the Field No. are shifted one bit position to the left.

The remainder (R3) is the zone number and the quotient (Q3) is the channel number.

The quotient (Q3) (channel number) has five binary bits. Accordingly, a maximum of five subtract operations are required to perform the division.

The accepted value obtained in the second, third and fourth translation steps are divided by the zone interlace ratio as determined by the Field No. Thus, the divisor used in the fifth translation step is determined by the value of the Field No. stored in bit positions 10 and 11. With reference to FIG. 1, it will be seen that bit positions 10 and 11 of the disk address register 30 are connected to the gating matrix 38. The gating matrix 38 is responsive to the control signal at the *e*16 output of the sequence counter 32 for storing the 1's complement +1 of the zone interlace ratio into the subtractor register 34. The zone interlace ratio used is the one which corresponds to the Field No. contained in the disk address register 30 at bit positions 10 and 11.

Considering now the actual example in Table III, the Field No. contained in bit positions 10 and 11 following *e*15 is the binary number 01 which, in decimal form, is Field #1. Referring to Table I, it will be seen that the zone interlace ratio for Field #2 is 4. With reference to Table II, it will be seen that the 1's complement +1 of the binary equivalent of the decimal number 4 is 1100. This value is used in the repetitive subtraction operations of the division during the fifth translation step.

The control signal at *e*16 starts the fifth step and causes the gating matrix 38 to store the value 1100 into the subtractor register 34. The adder 36 immediately combines the four bits in the subtractor register 34 with the four most significant bits in the disk address register 30 and provides an output corresponding to the sum and any carry. With reference to Table III, it will be seen that a carry signal ($C=1$) is produced, indicating that the subtraction is valid. The carry signal ($C=1$) and the control signal at *e*17 causes the gating matrix 40 to store the sum produced by the adder 36 back into the four most significant bit positions of the disk address register 30 and causes the gating matrix 40 to store a 1 bit into bit position 9. Thus the most significant bit of quotient (Q3) is stored into bit position 9.

Should the output of the adder 36 have not produced a carry during the control signal at *e*17, the gating matrix 40 would not have altered the four most significant bits of the disk address register 30 and a 0 bit would have been stored into bit position 9 of the disk address register 30 as the subtraction would have been an invalid one.

However, continuing with the example, the subtraction is valid and the control signal at *e*18 causes the content of bit positions 9 through 22 of the disk address register 30 to be unconditionally shifted one bit position to the left. The first of the five subtract operations is now complete and the first bit of the quotient (Q3) contained in bit position 10. Also the intermediate remainder of R3 is contained in bit positions 17 through 23.

The adder 36 now combines the content of the subtractor register 34 with the new contents of the most significant four bits of the disk address register 30 and produces an output corresponding to the sum. As indicated at *e*19 in Table III, no carry signal ($C=0$) is produced by the adder 36. Accordingly, the subtraction is an invalid one and does not take place. The lack of a carry signal ($C=0$) together with the control signal at *e*19 causes the gating matrix 40 to store a 0 bit into bit position 9 of the disk address register 30 and leave the remainder of the disk address register 30 unaltered.

The sequence counter 32 then forms a control signal at the *e*20 output. The control signal at the *e*20 output causes the contents of bit positions 9 through 22 to be shifted one position to the left as indicated in Table III.

At this point the two most significant bits of the quotient (Q3) are stored in bit positions 10 and 11 and the intermediate result for R3 is contained in bit positions 18 through 23.

The actions of the gating matrix 40 in response to the control signals at *e*21, *e*23 and *e*25 are similar to that during *e*17 and *e*19. That is, if a carry signal is formed by the adder 36 a valid subtraction is indicated and the gating matrix 40 stores the sum signal out of the adder 36 into the four most significant bit positions of the register 30 and a 1 bit is stored into bit position 9. If on the other hand, there is no carry signal, indicating an invalid subtraction, a 0 bit is stored into bit position 9 and the remainder of the register 30 remains unaltered. During the signals at *e*22, *e*24 and *e*26 the content of bit positions 9 through 22 are unconditionally shifted one bit position to the left.

The action of the system for the example in Table III during *e*21 through *e*26 can be followed and understood by making reference to Table III and the foregoing discussion of the operation during *e*17 to *e*20.

Following the control signal at *e*26 of the sequence counter 32 the content of the disk address register 30 is as shown in Table III. In other words, the disk address register 30 now contains separate signals representative of each of the following values: zone number (R3); disk number (Q2); Field No.; channel number (Q3); and word address (R1) (the last signal not being shown in Table III).

After the translation is complete the control signal at *e*26 indicates to the disk position selection circuitry 18 that the translation is complete and that a read or write operation can take place as required. The particular head 12 which is to be used in the read or write operation is determined by the head or transducer selection signals including the disk number, the Field No. and the channel number. Signals including the zone number and word address number specify the angular position of the disk at which the reading or writing operation is to take place.

Several features of the system should be noted. Although not all of these features are essential to the broad aspects of the invention they are incorporated in a preferred embodiment. One feature which is of importance in reducing the cost and complexity of the system is that the actual number of addressable groups were made to be as close to an exact binary number as possible. This enabled the bits upon which the adder 36 operates to be restricted to the four high order bit positions. It will also be apparent to those skilled in the art that portions or all of the adder circuit 36 and gating matrix 40 may be formed by a gating matrix which performs the same function as that described hereinabove for the adder 36 and gating matrix 40. It will also be evident that, since the same subtrahend is used in each conversion operation, portions or all of the subtractor register 34 might be eliminated and replaced by a wired in type of logic which is combined with the adder 36 and the gating matrix 40.

Additionally, only positive differences are recognized during the various subtraction operations. This feature was taken advantage of by adding the binary 1 to the 1's complement of all subtractors at the outset and only permitting valid subtractions (ones which produce a positive result) to take place. The method and apparatus employed herein is a preferred one wherein the 1's complement +1 is added to an address until the lack of a carry is detected storing only the result of those additions which produce a carry. However, within the broader aspects of this invention an embodiment may add the 1's complement of the subtrahend to the address until the lack of a carry is detected storing all results including the invalid one wherein no carry is produced. The invalid result is then corrected by adding back in the uncomplemented subtrahend +1.

It is desired for the translation operation to take place as rapidly as possible in order to avoid delays between receiving the binary address and reading from the disk file. Accordingly, the adder 36 contains a parallel carry chain (not shown) commonly known in the computer art, to reduce the time each subtraction takes.

It should be noted that the information format disclosed herein is a preferred format. However, other formats may be devised within the spirit and scope of the claims. Also, by appropriately changing the control signals and logical gating networks addresses in other number base system may be converted, for example, binary-coded-decimal address signals.

Although one example of the present invention has been shown by way of illustration, it should be understood that there are many other rearrangements and embodiments of the present invention within the scope of the following claims.

TABLE I.—INFORMATION FORMAT FOR EACH DISK

| | Field No. | | |
|---|---|---|---|
| | #1 | #2 | #3 |
| Channels per field | 32 | 32 | 32 |
| Zone Interlace Ratio | 3 | 4 | 5 |
| Total number of zones per field | 96 | 128 | 160 |
| Total Word Addresses | 512 | 512 | 512 |

TABLE II

| | Binary Equivalent |
|---|---|
| Maximum Addressable Words, 2,162,688 | 1 0 0 0 0 1 0 0 0 0 0 0 0 0 0 0 0 0 0 0 0 0 |
| Maximum Word Address, 512 | 1 0 0 0 0 0 0 0 0 0 |
| | 0 1 1 0 0 0 0 0 0 0 |
| Maximum No. of Addressable Zones per disk, 384 | 1's comp.+1→(1 0 1 0 0 0 0 0 0 0) |
| Maximum number of Addressable Discs, 11 | 1 0 1 1 |
| | 0 0 1 1 0 0 0 0 0 |
| Maximum Addressable Zones in Field #1, 96 | 1's comp.+1→(1 1 0 1 0 0 0 0 0 0) |
| | 0 1 0 0 0 0 0 0 0 |
| Maximum Addressable Zones in Field #2, 128 | 1's comp.+1→(1 1 0 0 0 0 0 0 0 0) |
| Maximum Addressable Zones in Field #3, 160 | 0 1 0 1 0 0 0 0 0 |
| | 0 0 1 1 |
| Zoned Interlace Ratio Field #1, 3 | 1's comp.+1→(1 1 0 1) |
| | 0 1 0 0 |
| Zoned Interlace Ratio Field #2, 4 | 1's comp.+1→(1 1 0 0) |
| | 0 1 0 1 |
| Zoned Interlace Ratio Field #3, 5 | 1's comp.+1→(1 0 1 1) |

TABLE III

EXAMPLE OF OPERATION FOR CONVERSION

| Bits of Binary Address | 21 20 19 18 17 16 15 14 13 12 11 10 9 - - |
|---|---|
| Bits of Disk Address Reg-30 | 23 22 21 20 19 18 17 16 15 14 13 12 11 10 9 * |

| Trans. Steps | Cont. Sigs. | Carry | |
|---|---|---|---|
| First (÷512) | | | Q1 |
| | Tg8 | | 0 1 0 0 0 0 0 1 1 1 0 0 0 - - |
| Second (÷ 384) | e1 | | 1 0 1 sub. reg. |
| | e2 | C = 0 | 1 1 1 adder out. 0 |
| | e3 | | 1 0 0 0 0 0 1 1 1 0 0 0. 0 - - |
| | | | 1 0 1 sub. reg. |
| | e4 | C = 1 | 1 0 1 0 0 0 1 1 1 0 0 0 0 1 - |
| | e5 | | 0 1 0 0 0 1 1 1 0 0 0 0 1 - - |
| | | | 1 0 1 sub. reg. |
| | e6 | C = 0 | 1 1 1 adder out. 0 |
| | e7 | | 1 0 0 0 1 1 1 0 0 0. 0 1 0 - - |
| | | | 1 0 1 sub. reg. |
| | e8 | C = 1 | 0 0 1 0 1 1 1 0 0 0. 0 1 0 1 - |
| | | | R2 Q2 |
| | e9 | | 0 1 0 1 1 1 0 0 0. 0 1 0 1. - - |
| Third (- 96) | e10 | | 1 1 0 1 sub. reg. |
| | | | D1 Q2 |
| | e11 | C = 1 | 0 0 1 0 1 1 0 0 0. 0 1 0 1. - 1 |
| Fourth (- 128) | e13 | | 1 1 0 0 sub. reg. |
| | e14 | C = 0 | 1 1 1 0 adder out. 0 |
| | | | D1 Q2 Field No. |
| Fifth (÷ Zone Interlace Ratio) | e15 | | 0 1 0 1 1 0 0 0. 0 1 0 1. 0 1. - |
| | e16 | | 1 1 0 0 sub. reg. |
| | e17 | C = 1 | 1 0 0 1 1 0 0 0. 0 1 0 1. 0 1. 1 |
| | e18 | | 0 0 1 1 0 0 0. 0 1 0 1. 0 1. 1 - |
| | | | 1 1 0 0 sub. reg. |
| | e19 | C = 0 | 1 1 1 1 adder out. 0 |
| | e20 | | 0 1 1 0 0 0. 0 1 0 1. 0 1. 1 0 - |
| | | | 1 1 0 0 sub. reg. |
| | e21 | C = 1 | 0 0 1 0 0 0. 0 1 0 1. 0 1. 1 0 1 |
| | e22 | | 0 1 0 0 0. 0 1 0 1. 0 1. 1 0 1 - |
| | | | 1 1 0 0 sub. reg. |
| | e23 | C = 1 | 0 0 0 0 0. 0 1 0 1. 0 1. 1 0 1 1 |
| | e24 | | 0 0 0 0. 0 1 0 1. 0 1. 1 0 1 1 - |
| | | | 1 1 0 0 sub. reg. |
| | e25 | C = 0 | 1 1 0 0 adder out. 0 |
| | | | R3 Q2 Field No. Q3 |
| | e26 | | 0 0 0. 0 1 0 1. 0 1. 1 0 1 1 0. - |
| | | | Zone Disk Field Channel |

(*Bits 0 - 8 not shown)

I claim:

1. In a data processing system comprising storage means including a rotating recording surface having a predetermined information format thereon, a plurality of transducing means for reading and writing on the recording surface, controllable transducer selection and angular position selection circuitry for selecting a transducing means and an angular position on a recording surface to access; a data processor for providing coded addresses for said storage means; and arithmetic means coupled between said data processor and storage means for receiving a coded address designating a location to be accessed on the recording surface and for converting the same to individual transducer selection and angular position selection signals for use in separately controlling accessing on a recording surface by said controllable transducer selection and angular position selection circuitry, respectively.

2. In a data processing system comprising a rotating recording surface having a predetermined information format thereon, a plurality of transducing means for reading and writing on the recording surface, controllable transducer selection and angular position selection circuitry for selecting a transducing means and an angular position on a recording surface to access and arithmetic means for receiving a coded address designating a location to be accessed on the recording surface and for performing a series of repetitive substractions on the coded address for converting the same to individual transducer selection and angular position selection signals for use in separately controlling accessing on a recording surface by said controllable transducer selection and angular position selection circuitry, respectively.

3. In a data processing system comprising at least one rotating recording surface having a plurality of transducing means positioned at different positions on the recording surface for defining individual channels for storage of information and for reading and writing thereon, controllable transducer selection and angular position selection circuitry for selecting a transducing means and an angular position of said recording surface for reading or writing, and arithmetic means for receiving coded address signals and for converting the same to separate transducing identification signals for control of said transducing selection means and angular identification signals for control of said angular position selection circuitry.

4. In a data processing system comprising a plurality of rotating recording surfaces having a plurality of transducing means for reading and writing thereon each recording surface having a predetermined data format arranged into a plurality of annular fields each having a plurality of annular channels for recording information, each field being divided into a different number of radial zones, each zone being divided into a different number of radial word addresses, controllable transducer selection and angular position selection circuitry for selecting a transducer means and an angular position of a recording surface for access and arithmetic means coupled to said selection means for receiving a coded binary address and for converting the same to individual signals designating a field, a recording surface and a channel for controlling the transducer selection circuitry and to individual signals designating a zone and a word address for controlling the angular position selection circuitry.

5. In a data processing system according to claim 4 wherein said arithmetic means comprises register means for storing the coded binary address to be converted and means responsive to the content of said first register for performing predetermined data manipulations thereon and for selectively storing individual signals into said first register designating a recording surface, a field, a channel, a zone and a word address.

6. In a data processing system according to claim 5 wherein said means for performing predetermined data manipulations comprises combining means coupled only to a limited number of the most significant bits of the coded binary address in said first register means and responsive thereto for performing effective reiterative subtraction operations thereon and for selectively storing the result obtained into said first register means and for selectively shifting the content of said register means until the binary number is fully converted.

7. In a data processing system according to claim 6 including means providing a valid subtraction signal indicative of whether a subtraction resulting in a positive difference is obtained in each iterative subtraction and wherein said combining means comprises gating means for conditionally and selectively inserting a predetermined signal into said register means in response to said valid subtraction signal.

8. In a data processing system comprising a rotatable recording surface having a predetermined information format thereon, a plurality of transducing means for reading and writing on the recording surface, controllable transducer selection and angular position selection circuitry for selecting a transducing means and an angular position of the recording surface to access, data processing means for providing a pure binary address designating a particular storage location on the recording surface, and arithmetic means coupled in between the data processing means and said selection circuitry for converting the pure binary address to separate transducer selection and angular position selection signals for controlling accessing on the recording surface by said controllable transducer selection and angular position selection circuitry, respectively.

9. In a data processing system according to claim 8 wherein said arithmetic means includes means for performing repetitive subtraction operations on said pure binary address in converting said address.

10. In a data processing system according to claim 8 wherein said arithmetic means comprises a register for storing said pure binary number during the conversion process.

11. In a data processing system according to claim 10 wherein said arithmetic means comprises a further register, control means for storing a binary number signal partially defining said information format into said further register and means responsive to the signals in said register and further register for modifying the binary address stored in said register in a predetermined manner and thereby cause separate transducer selection and angular position selection signals to be formed in said register.

12. In a data processing system according to claim 8 wherein said recording surface contains a plurality of annular fields each having a plurality of annular channels for recorded information, each of said fields being divided into a different number of radial zones, each zone being divided into different numbers of radial word addresses, said arithmetic means being operative to convert said pure binary address into separate signals representative of a field, a channel, a zone, and a word address, the field and channel signals being transducer selection signals and the zone and word signals being the angular position signals.

13. In a data processing system according to claim 12 wherein there are a plurality of recording surfaces and the arithmetic means further converts said pure binary address to a separate transducer selection signal corresponding to a recording surface.

14. In a data processing system comprising a rotating recording surface having a predetermined information format thereon, a plurality of transducing means for reading and writing on the recording surface, controllable transducer selection and angular position selection circuitry for selecting a transducing means and an angular position on a recording surface to access and arithmetic means for receiving a coded address designating a location to be accessed on the recording surface including control means for providing at least one signal corresponding to each parameter in the information format which is to be determined, parameter generator means responsive to each control signal for forming at least one parameter signal to be used for modifying a coded address, said arithmetic means utilizing said parameter signals for performing a series of repetitive subtractions on the coded address for converting the same to individual transducer selection and angular position selection signals for use in separately controlling accessing on a recording surface by said controllable transducer selection and angular position selection circuitry, respectively.

15. In a data processing system according to claim 14 wherein said arithmetic means includes register means for storing said received coded address.

16. In a data processing system according to claim 15 wherein said arithmetic means includes adder means for combining the parameter and coded address signals.

References Cited

UNITED STATES PATENTS

| | | |
|---|---|---|
| 2,863,134 | 12/1958 | Buchholz et al. |
| 2,984,827 | 5/1961 | Trapnell, Jr., et al. |
| 3,139,521 | 6/1964 | Johnson, Jr. |
| 3,289,174 | 11/1966 | Brown et al. |

GARETH D. SHAW, Primary Examiner

PO-1050
(5/69)

UNITED STATES PATENT OFFICE
CERTIFICATE OF CORRECTION

Patent No. 3,564,513 Dated February 16, 1971

Inventor(s) J. A. Hibner

It is certified that error appears in the above-identified patent and that said Letters Patent are hereby corrected as shown below:

Col. 1, line 43, "writin" should read --writing--;
Col. 7, line 68, "(C=0" should read --(C=0);

Col. 8, line 31, "the", second occurrence, should be deleted.

Col. 9, line 50, "10", second occurrence, should read --1 0--;
Col. 10, line 24, "01" should read --0 1--;
line 25, "#1" should read --#2--;
Col. 12, line 23, "operation" should read --operations--;
line 34, "system" should read --systems--;

Table III, col. 13, e4, e5, under Q1, that portion of the formula reading 1 0 1 0 0 0 1 1 1 0 0 0 0 1 -
0 1 0 0 0 1 1 1 0 0 0 0 1 - - should read 1 0 1 0 0 0 1 1 1 0 0 0. 0 1 -
0 1 0 0 0 1 1 1 0 0 0. 0 1 - -

(decimal point before second digit from the right)

Col. 9, line 51, "representing Field #" should be deleted.

Signed and sealed this 10th day of September 1974.

(SEAL)
ttest:

lcCOY M. GIBSON, JR.
ttesting Officer

C. MARSHALL DANN
Commissioner of Patents